United States Patent
Shobe (10) Patent No.: US 11,122,925 B2
(45) Date of Patent: Sep. 21, 2021

(54) DRONE DELIVERY CONTAINER ASSEMBLY HAVING DELIVERY STATE ASSEMBLY HAVING OPENING/CLOSING ASSEMBLY AND ELEVATOR ASSEMBLY

(71) Applicant: Loren Shobe, Toledo, IL (US)

(72) Inventor: Loren Shobe, Toledo, IL (US)

(*) Notice: Subject to any disclaimer, the term of this patent is extended or adjusted under 35 U.S.C. 154(b) by 0 days.

(21) Appl. No.: 16/598,572

(22) Filed: Oct. 10, 2019

(65) Prior Publication Data

US 2020/0113365 A1 Apr. 16, 2020

Related U.S. Application Data

(60) Provisional application No. 62/744,237, filed on Oct. 11, 2018.

(51) Int. Cl.
| | |
|---|---|
| *B64F 1/32* | (2006.01) |
| *A47G 29/14* | (2006.01) |
| *B65D 81/18* | (2006.01) |
| *B65D 43/16* | (2006.01) |

(52) U.S. Cl.
CPC ............. *A47G 29/141* (2013.01); *B64F 1/32* (2013.01); *B65D 43/16* (2013.01); *B65D 81/18* (2013.01); *A47G 2029/147* (2013.01)

(58) Field of Classification Search
CPC ............ A47G 29/141; A47G 2029/147; B65D 81/18; B64F 1/32; B64F 1/368; B65G 67/00; B65G 2201/0285; B66B 1/3446
USPC .......................................................... 340/5.2
See application file for complete search history.

(56) References Cited

U.S. PATENT DOCUMENTS

| | | | |
|---|---|---|---|
| 2015/0379796 | A1 | 12/2015 | Glasgow et al. |
| 2016/0033966 | A1* | 2/2016 | Farris ................... A47G 29/141 |
| | | | 701/15 |
| 2016/0140496 | A1 | 5/2016 | Simms et al. |
| 2016/0257423 | A1 | 9/2016 | Martin |
| 2017/0286905 | A1 | 10/2017 | Richardson et al. |
| 2018/0049575 | A1 | 2/2018 | Yamrick |
| 2018/0092484 | A1 | 4/2018 | Lewis et al. |
| 2018/0105289 | A1 | 4/2018 | Walsh et al. |

(Continued)

FOREIGN PATENT DOCUMENTS

| | | |
|---|---|---|
| CN | 201756870 U | 3/2011 |
| CN | 205787896 U | 12/2016 |

(Continued)

OTHER PUBLICATIONS https://www.suasnews.com, & Press. (Nov. 16, 2016). Safe Drone Delivery by Cleveron, Clevernest.

(Continued)

*Primary Examiner* — Vernal U Brown
(74) *Attorney, Agent, or Firm* — Dinsmore & Shohl LLP (57) ABSTRACT

A delivery container assembly for receiving a package. The delivery container assembly includes a container having at least one wall and an open top end defining a storage space. The container includes a lid hingedly coupled to the container and is movable between an open position and a closed position. The container includes an elevator assembly disposed within the container and including an elevator floor movable between a lowered position and a raised position. The lid is movable from the closed position to the open position upon movement of the elevator floor from the lowered position to the raised position.

19 Claims, 7 Drawing Sheets

(56) References Cited

U.S. PATENT DOCUMENTS

2018/0130017 A1    5/2018  Gupte
2018/0144642 A1    5/2018  High et al.
2019/0152701 A1*  5/2019  Eck .......................... B65G 1/06

FOREIGN PATENT DOCUMENTS

DE        19620973 A1    10/1997
EP         1236656 A1     9/2002

OTHER PUBLICATIONS

Drone Delivery systems; Specification sheet, 2018.
Michel, Arthur Holland; Center for the Study of the Drone, Bard College; Amazon's Drone Patents; 2017.
https://carolinadronz.com/; One Stop Shop for all Aerial/UAV/Drone Products. 2020.
International Search Report and Written Opinion pertaining to Application No. PCT/US2019/055598 dated Mar. 18, 2020, 12 pages.
YouTube video entitled "Smart Delivery System", Danny Horein, Published on Dec. 22, 2018; URL: <https://www.youtube.com/watch?v=U1iEhMGL06k&feature=youtu.be>, 46 pages.

\* cited by examiner

DRONE DELIVERY CONTAINER ASSEMBLY HAVING DELIVERY STATE ASSEMBLY HAVING OPENING/CLOSING ASSEMBLY AND ELEVATOR ASSEMBLY

CROSS-REFERENCE TO RELATED APPLICATION

This application is a non-provisional application which claims the priority benefit of U.S. Provisional Patent Application Ser. No. 62/744,237, filed Oct. 11, 2018, for "Drone Delivery Container Assembly Having Delivery State Assembly Having Opening/Closing Assembly and Elevator Assembly," the entire disclosure of which, including the drawings, is hereby incorporated by reference.

TECHNICAL FIELD

The present disclosure is directed to a drone delivery container assembly, and more particularly, to a drone delivery container assembly having an elevator floor assembly and an opening/closing assembly to allow for delivery, such as by drone, of a package into an open top end of the container and lowering of the delivered package into a storage space of the container by the elevator assembly upon movement of a lid from an open position to a closed position by the opening/closing assembly.

BACKGROUND

Drone delivery services are becoming increasingly popular to quickly deliver packages. Specifically, drones are loaded with packages, such as food, and deliver the packages to a specified location, such as a house. However, when delivering packages, the drones need a specified place to deliver the package otherwise the packages are merely disposed on a front lawn. Further, there is a risk of delivered packages being stolen or food, such as produce or perishables, spoiling without refrigeration.

It has been known to provide specified containers for the delivery of packages. However, with drone delivery, it is difficult for drones to land within the container and deliver the package on a floor of the container without potential damage to the drone.

Accordingly, a need exists for an apparatus for receiving packages from a drone, maintaining the package at an optimal temperature to avoid spoilage, and securing the package within the apparatus until it is to be retrieved by the correct recipient.

SUMMARY

In one embodiment, a delivery container assembly for receiving a package includes a container and an elevator assembly disposed within the container. The container has at least one wall and an open top end defining a storage space. The container includes a lid hingedly coupled to the at least one wall of the container and movable between an open position and a closed position. The elevator assembly includes an elevator floor movable between a lowered position and a raised position. The lid is coupled to the elevator assembly such that, upon movement of the elevator floor from the lowered position to the raised position, the lid moves from the closed position to the open position.

In another embodiment, a delivery container assembly includes a container and an elevator assembly disposed within the container. The container has a plurality of walls and an open top end defining a storage space. The container includes a lid hingedly attached to one of the plurality of walls and a flexible connector. The lid is movable between an open position and a closed position. The elevator assembly includes an elevator floor movable between a lowered position and a raised position. The flexible connector couples the elevator assembly to the lid. The delivery container assembly is configured to delay rotation of the lid as the elevator floor moves between the raised position and the lowered position.

In yet another embodiment, a method for opening and closing a delivery container assembly includes the steps of receiving at an electronic control unit a delivery signal, upon receiving the delivery signal, moving an elevator floor provided within the container from a lowered position to a raised position, the elevator floor configured to rotate a lid hingedly attached to the container from a closed position to an open position, receiving at the electronic control unit a package delivered signal, and upon receiving the package delivered signal, moving the elevator floor from the raised position to the lowered position, the elevator floor configured to rotate the lid from the open position to the closed position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 5:
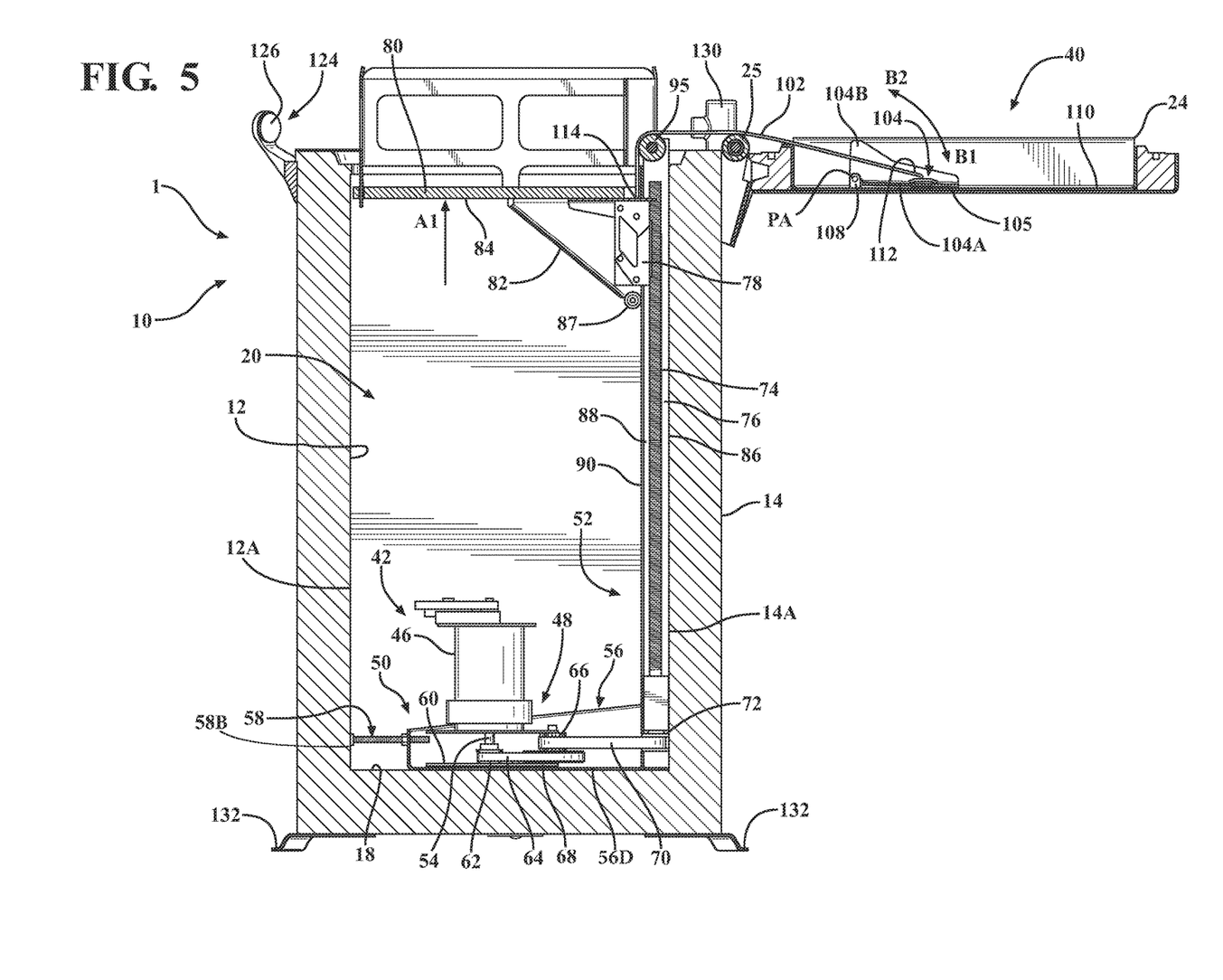
FIG. 5 schematically depicts a cross-sectional view of the drone delivery container assembly taken along the lines 5-5 of FIG. 2, according to one or more embodiments shown and described herein.
Figure 6:
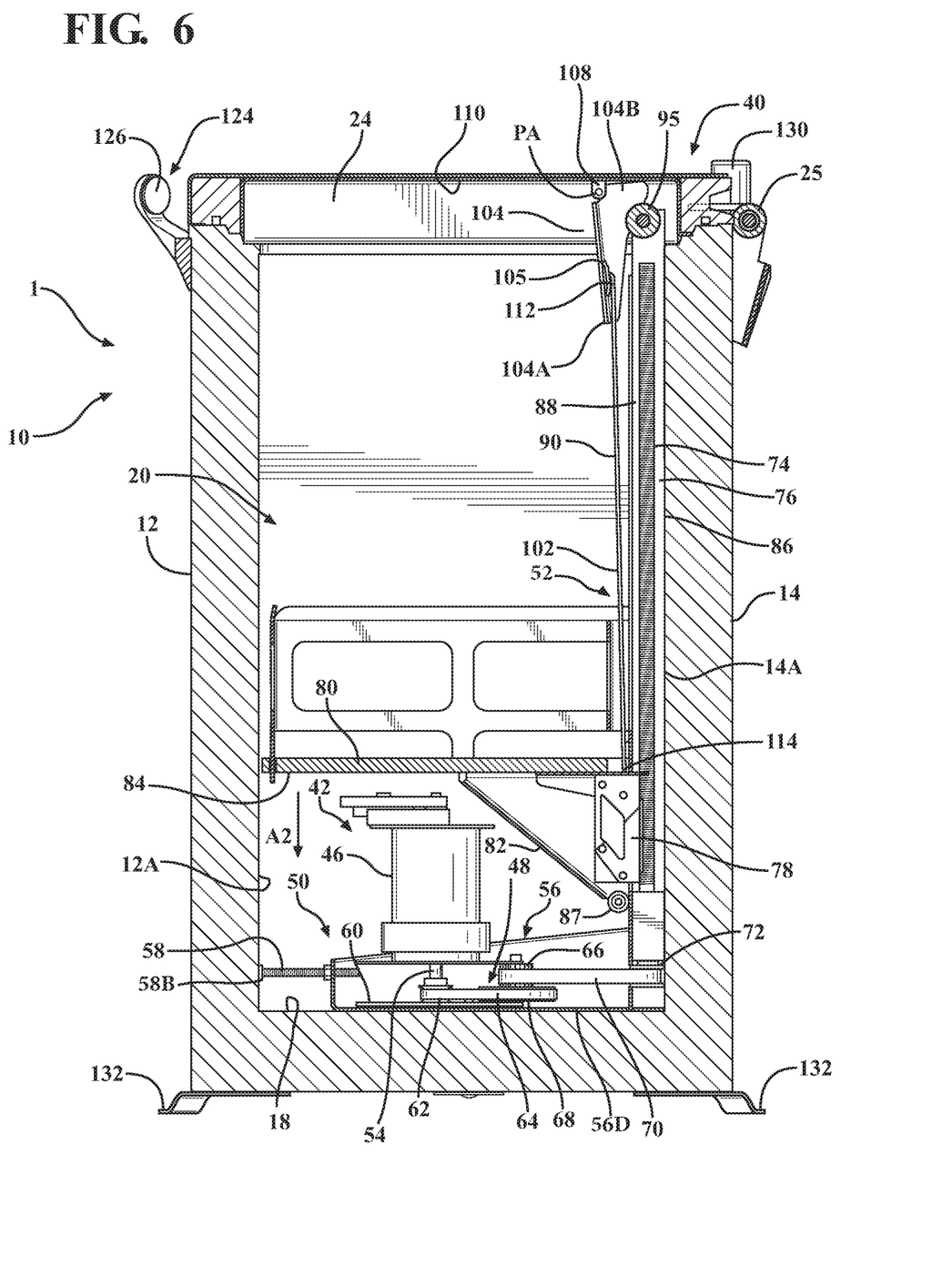
FIG. 6 schematically depicts a cross-sectional view of the drone delivery container taken along the lines 5-5 of FIG. 2 in which the elevator floor is in a lowered position and the lid is in a closed position, according to one or more embodiments shown and described herein.

Referring to FIGS. 1-7, a drone delivery container assembly 1 is illustrated. The drone delivery container assembly 1 includes a container 10 having a front wall 12, a rear wall 14, a pair of side walls 16, and a floor 18. The front wall 12, the rear wall 14, the pair of side walls 16, and the floor 18 generally define a storage space 20 within the container 10. The container 10 includes an open top portion 22 through which the storage space 20 is accessed. The container 10 includes a lid 24 hingedly connected by a lid hinge 25 to the rear wall 14 of the container 10 for movement between an open position, as shown in FIGS. 1-5, and a closed position, as shown in FIG. 6. In the open position, the lid 24 is rotated away from the open top portion 22 of the container 10 such that access to the storage space 20 is permitted. In the closed position, the lid 24 covers the open top portion 22 of the container 10 such that access to the storage space 20 is inhibited.

In some embodiments, the drone delivery container assembly 1 includes a temperature regulator assembly 26 configured to regulate an internal temperature of the storage space 20, and in which the front wall 12, the rear wall 14, the pair of side walls, 16, the floor 18, and the lid 24 are insulated to inhibit fluctuations of the internal temperature of the storage space 20. For example, the temperature regulator assembly 26 includes a refrigerator 26A and a heater 26B configured to cool and heat, respectively, the internal temperature of the storage space 20. In some embodiments, the container 10 is a commercially available top loading refrigerator/freezer chest. In some other embodiments, the container 10 is a commercially available top loading refrigerator/freezer chest modified to include the heater 26B.

Figure 1:
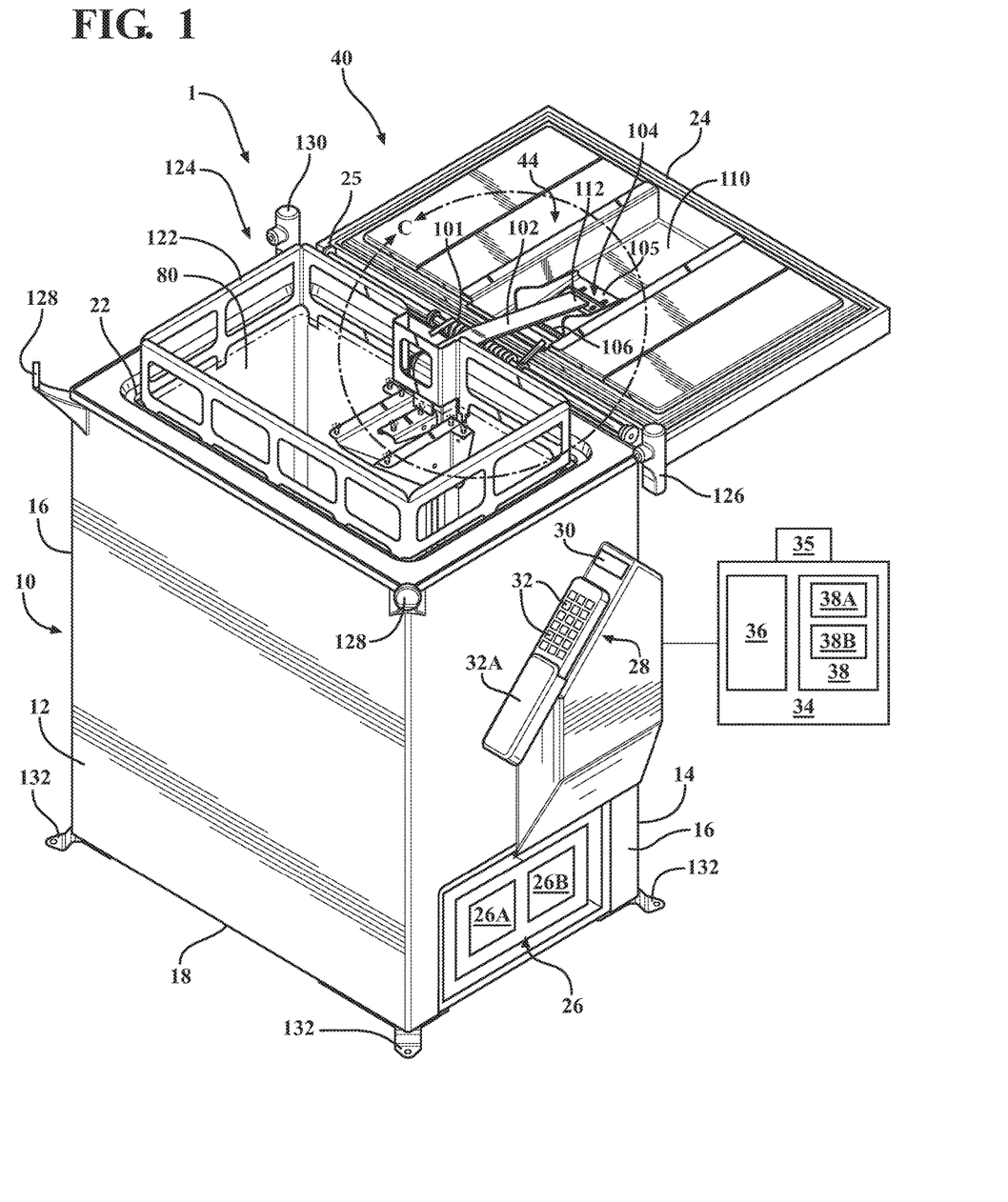
FIG. 1 schematically depicts a perspective view of a drone delivery container assembly in which an elevator floor is in a raised position and a lid is in an open position, according to one or more embodiments shown and described herein.
Figure 2:
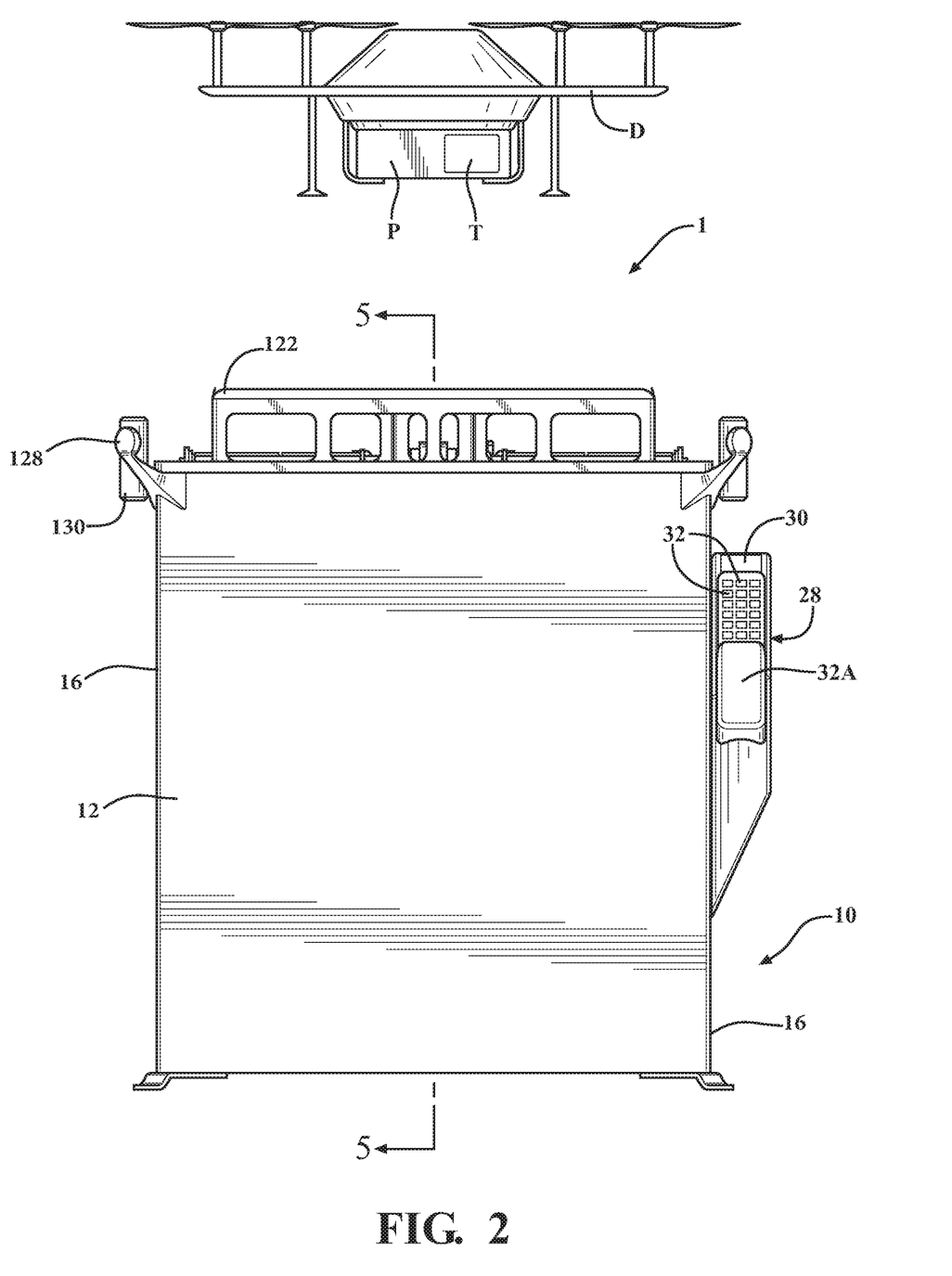
FIG. 2 schematically depicts a front view of the drone delivery container assembly of FIG. 1, according to one or more embodiments shown and described herein.
Figure 3:
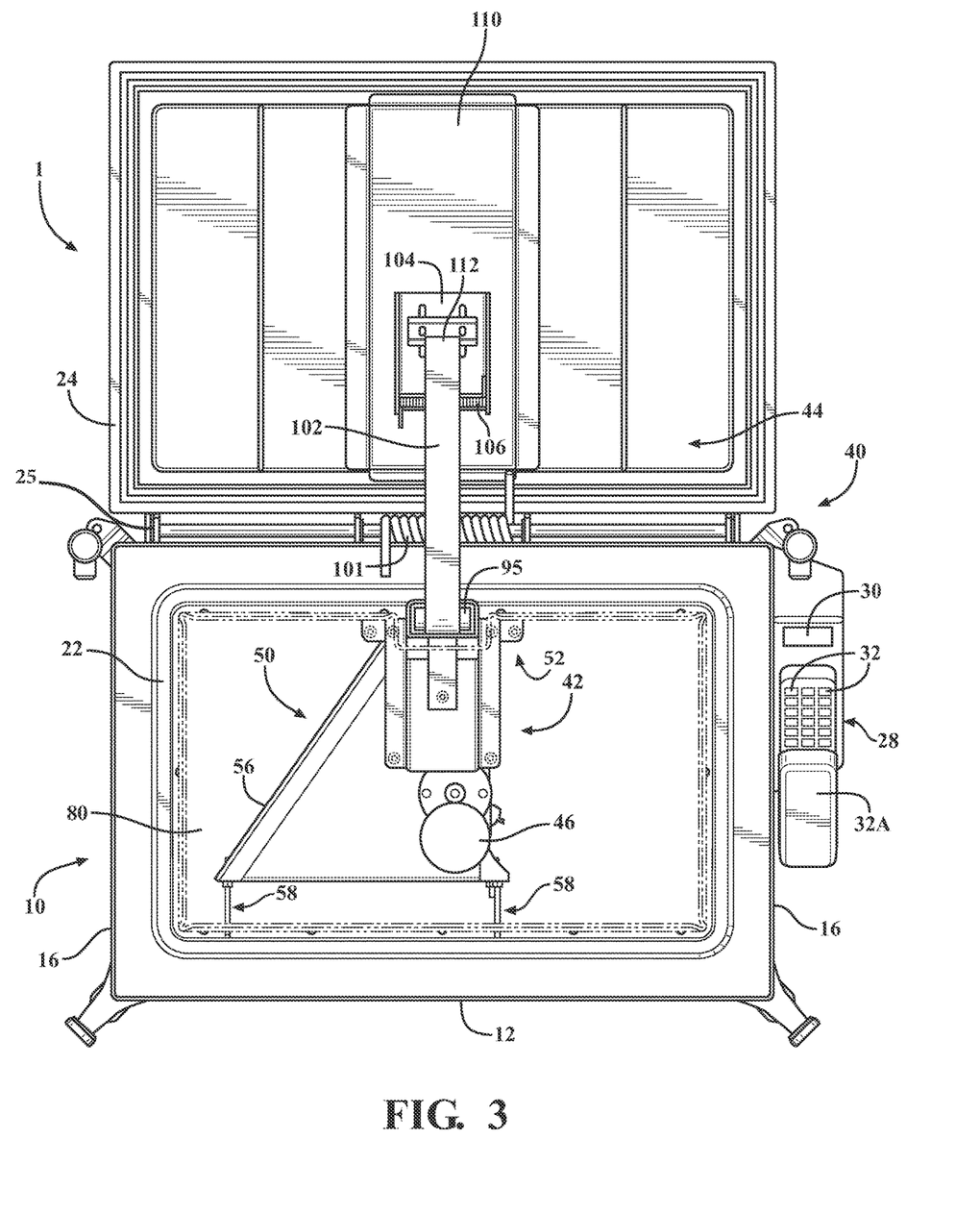
FIG. 3 schematically depicts a top view of the drone delivery container assembly of FIG. 1, according to one or more embodiments shown and described herein.
Figure 4:
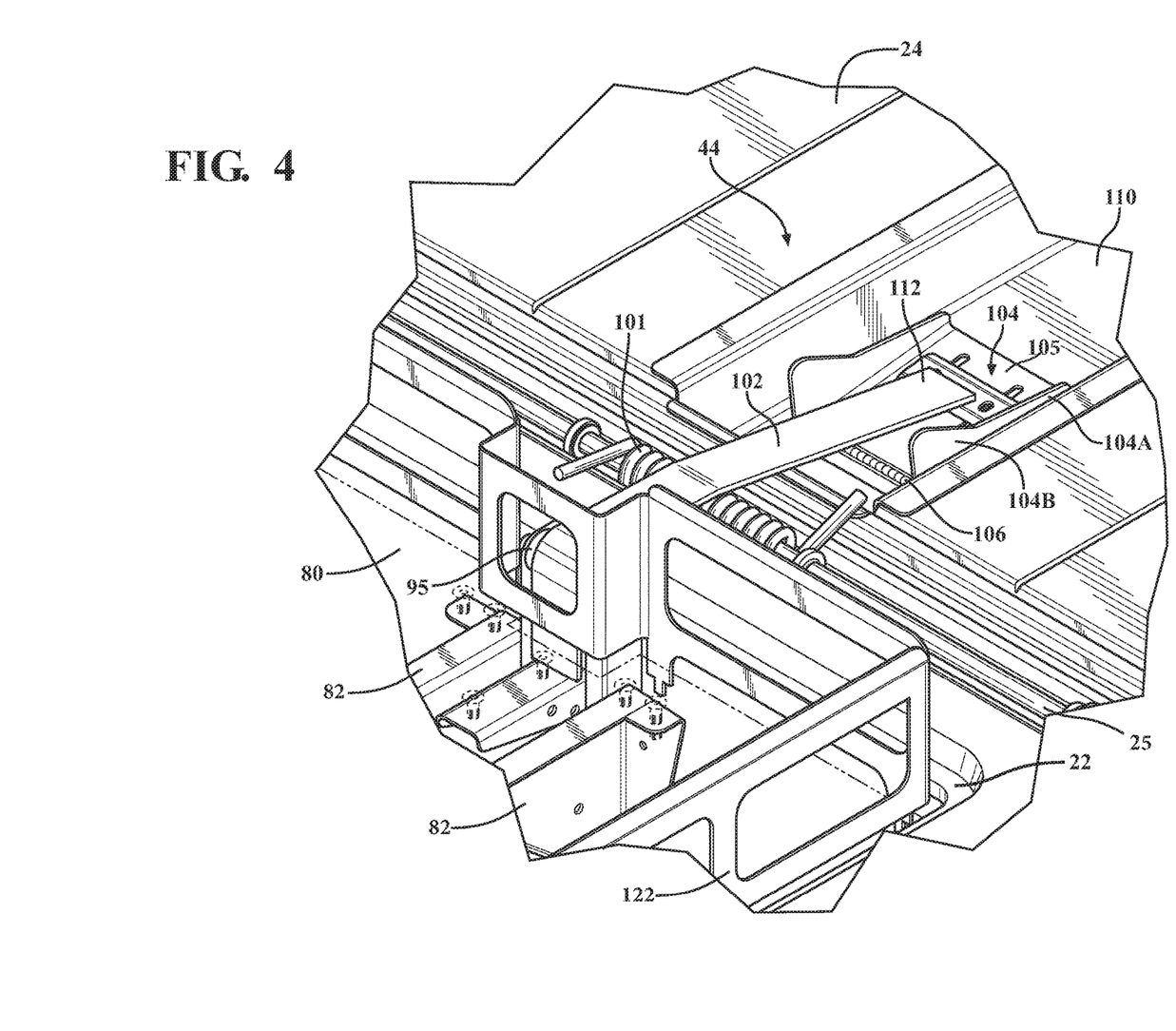
FIG. 4 schematically depicts an enlarged view of circle C of the drone delivery container assembly of FIG. 1, according to one or more embodiments shown and described herein.

The drone delivery container assembly 1 may also include a user interface 28 that includes a display device 30 and a plurality of inputs 32. In some embodiments, the inputs 32 are provided on a numerical key pad on the user interface 28 having a cover 32A movable between a covered position and an uncovered position, as shown in FIG. 1. In the covered position, the cover 32A covers the inputs 32 to inhibit access to the inputs 32 and to protect the inputs 32 against the elements, and in the uncovered position, the cover 32A permits access to the inputs 32. The cover 32A moves from the covered to the uncovered position in any suitable manner, such as by sliding, pivoting, or entirely removing the cover 32A from the user interface 28 temporarily, in order to access the inputs 32.

The drone delivery container assembly 1 may also include an electronic control unit 34 and a transceiver 35 coupled to the electronic control unit 34. The electronic control unit 34 in communication with the transceiver 35, the user interface 28, the display device 30, the inputs 32, the temperature regulator assembly 26, and an electric motor 46. In some embodiments, the electronic control unit 34 includes a processor 36 and a memory component 38 coupled to the processor 36. The processor 36 is a central processing unit (CPU). The processor 36 includes processing components operable to receive and execute instructions from the memory component 38. The memory component 38 stores detection logic 38A and control logic 38B. The detection logic 38A and the control logic 38B may each include a plurality of different pieces of logic, each of which may be embodied as a computer program, firmware, and/or software/hardware. In some embodiments, the user interface 28, the display device 30, the inputs 32, the electronic control unit 34, and the transceiver 35 are provided on or within the container 10, as shown in FIG. 1. In some other embodiments, the user interface 28, the display device 30, the inputs 32, the electronic control unit 34, and the transceiver 35 of the drone delivery container assembly 1 are provided remote from the container 10 and are connected in either a wired or wireless communication.

The drone delivery container assembly 1 includes a delivery state assembly 40 that is configured to position the drone delivery container assembly 1 between a delivery state and a delivered state. As described in greater detail below, in the delivery state, the drone delivery container assembly 1 is configured to receive a package, and in the delivered state, the drone delivery container assembly 1 is configured to securely store and regulate a temperature of a delivered package. The delivery state assembly 40 includes an elevator assembly 42 and an opening/closing assembly 44. The opening/closing assembly 44 and the elevator assembly 42 operate in conjunction to position the drone delivery container assembly 1 between the delivery state and the delivered state.

Referring to FIGS. 3, 5, 6, and 7, the elevator assembly 42 includes the electric motor 46, a gear assembly 48, a support assembly 50, and a linear motion assembly 52.

The electric motor 46 is connected to a power supply (not shown) to supply power to the electric motor 46. The power supply is optionally an external power supply configured to supply power to the electric motor 46 through a power cord (not shown) or an internal power supply such as a power storage device (battery).

As shown more particularly in FIGS. 5 and 6, the electric motor 46 includes a drive shaft 54 that rotates upon activation of the electric motor 46 by the control logic 38B. The drive shaft 54 is connected to the gear assembly 48 that is connected to the linear motion assembly 52.

Figure 7:
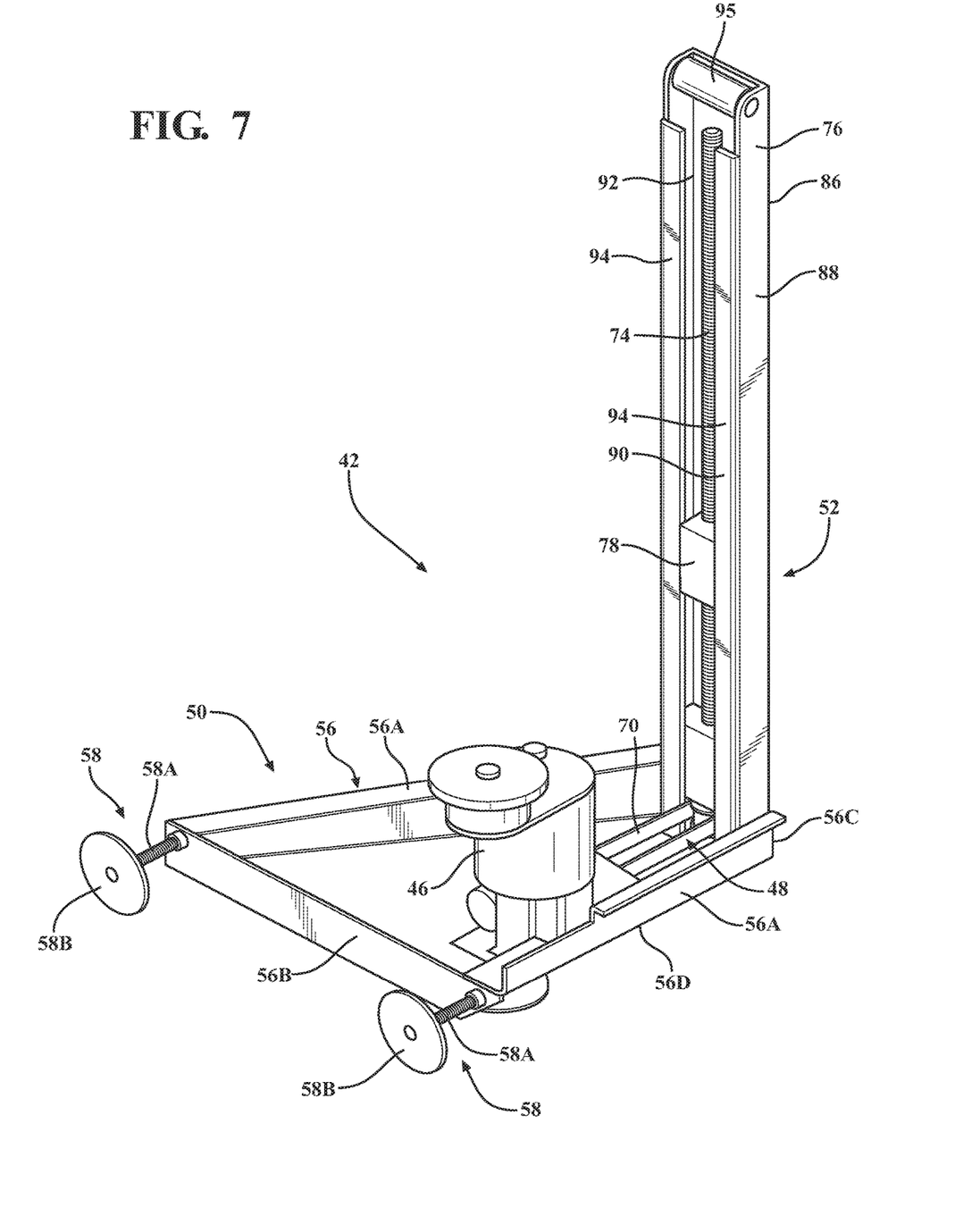
FIG. 7 schematically depicts a perspective view of an elevator assembly of the drone delivery container assembly of FIG. 1, according to one or more embodiments shown and described herein.

The electric motor 46 and the gear assembly 48 are connected to the support assembly 50. The support assembly 50 connects the electric motor 46 and the gear assembly 48 to the container 10. As shown in FIG. 7, the support assembly 50 includes a support frame 56 having a pair of side edges 56A, a front edge 56B, a rear edge 56C opposite the front edge 56B, and a lower surface 56D positioned above the floor 18. The rear edge 56C connects to the linear motion assembly 52 and optionally abuts an interior surface 14A of the rear wall 14. The front edge 56B includes a pair of biasing members 58 that extend between the front edge 56B and an interior surface 12A of the front wall 12.

The pair of biasing members 58 abut against the interior surface 12A of the front wall 12 to rigidly support the electric motor 46 within the storage space 20. In some embodiments, the biasing members 58 include a threaded shaft 58A that engages with the front edge 56B and a flange 58B at one end of the biasing members 58. The flange 58B abuts against the interior surface 12A of the front wall 12. Rotation of the threaded shaft 58A varies the distance between the flange 58B and the front edge 56B to allow for the support assembly 50 to be disposed within containers having different dimensions. The threaded shafts 58A are rotated until the flanges 58B abut against the interior surface 12A of the front wall 12 to secure the support assembly 50 within the storage space 20 of the container 10. It is appreciated that the biasing members 58 are optionally connected to the rear edge 56C.

The gear assembly 48 operatively connects the drive shaft 54 of the electric motor 46 to the linear motion assembly 52. In some embodiments, the drive shaft 54 is oriented so as to rotate about a container vertical direction and the gear assembly 48 transfers the rotation of the drive shaft 54 to the linear motion assembly 52.

In some embodiments, the gear assembly 48 includes a plurality of gear, sprockets, and timing belts to reduce a predetermined rotational output speed of the drive shaft 54 to a predetermined rotational input speed to be input into the linear motion assembly 52.

An elevator floor 80 is configured to be moved between a raised position, as shown in FIGS. 1-5, and a lowered position, as shown in FIG. 6. In the raised position, the elevator floor 80 is at least partially received within the open top end or portion 22 to receive a delivered package. In the lowered position, the elevator floor 80 is positioned closer to the floor 18 of the container 10 than when the elevator floor 80 is in the raised position. Specifically, the elevator floor 80 is positioned above the electric motor 46 and below the open top portion 22 such that the elevator floor 80 is entirely received within the storage space 20 in the lowered position.

Referring again to FIGS. 5 and 6, the gear assembly 48 may include a sprocket clevis 60 that secures the electric motor 46 to the support frame 56, a first timing sprocket 62, a first timing belt 64, a reducing gear 66, a second sprocket 68, a second timing belt 70, and a third sprocket 72. The first timing sprocket 62 is fixed to the drive shaft 54 to rotate with the rotation of the drive shaft 54, and the first timing sprocket 62 is rotatably attached to the sprocket clevis 60. The reducing gear 66 and the second sprocket 68 are rotatably connected to the sprocket clevis 60. The first timing belt 64 connects the first timing sprocket 62 to the reducing gear 66. The reducing gear 66 is fixed to the second sprocket 68. The second sprocket 68 is connected to the third sprocket 72 by the second timing belt 70.

The gear assembly 48 is configured to modify an output rotational speed of the drive shaft 54 to a predetermined input rotational speed at the third sprocket 72 due to the relative sizes of the first timing sprocket 62, the reducing gear 66, the second sprocket 68, and the third sprocket 72.

The linear motion assembly 52 translates the rotational movement of the third sprocket 72 into linear movement in a container vertical direction. The linear motion assembly 52 includes an externally threaded translation screw drive 74, an elongated track 76, an internally threaded trolley 78, an elevator floor 80, and a pair of flanges 82. The translation screw drive 74 is connected to the third sprocket 72 such that rotation of the third sprocket 72 rotates the translation screw drive 74. The translation screw drive 74 is disposed within the elongated track 76 that extends along the interior surface 14A of the rear wall 14. The elongated track 76 extends in the container vertical direction. The translation screw drive 74 is received within the internally threaded trolley 78 such that the external threads of the translation screw drive 74 engage with the internal threads of the trolley 78. The trolley 78 is connected to the elevator floor 80, specifically, a lower surface 84 of the elevator floor 80 connects to the trolley 78. The pair of flanges 82 extend between the lower surface 84 of the elevator floor 80 and the trolley 78 to reinforce the connection between the trolley 78 and the elevator floor 80.

As shown in FIG. 7, the elongated track 76 includes a back wall 86, a pair of side walls 88, and a front wall 90 defining an elongated opening 92 which defines a generally C-shaped cross-section of the elongated track 76. The translation screw drive 74 is received within the elongated track 76 and the trolley 78 is partially received within the elongated track 76 with a connection portion extending through the opening 92 of the elongated track 76 to couple the elevator floor 80 to the trolley 78.

In some embodiments, the trolley 78 includes an internally threaded throughbore through which the translation screw drive 74 extends. In some other embodiments, the trolley 78 includes an internally threaded semicircular cutout that meshes with the external threads of the translation screw drive 74. In such an embodiment, trolley 78 includes a pair of elongated slots on either side of the trolley 78 and the elongated slots receive side edges 94 of the front wall 90 that define the opening 92. At an upper end of the elongated track 76 a roller 95 extends between the pair of side walls 88.

In some embodiments, rollers 87 are provided on a lower portion of the pair of flanges 82 that roll along the front wall 90 on either side of the opening 92.

The pair of flanges 82 are spaced apart such that a portion of the electric motor 46, the gear assembly 48, and the support assembly 50 are received between the pair of flanges 82 when the elevator floor 80 is in the lowered position.

Referring to FIGS. 1 and 3-6, the opening/closing assembly 44 includes the lid 24, a lid hinge biasing member 101, such as a spring, a flexible connector 102, a closure lever 104, and a closure lever biasing member 106, such as a torsion spring. The lid hinge biasing member 101 is positioned between the rear wall 14 and the lid 24 when in an open position. The lid hinge biasing member 101 biases the lid 24 towards the open position.

A pair of posts 108 extend outwardly from an inner surface 110 of the lid 24. The closure lever 104 is pivotally attached to the pair of posts 108 at a closure lever pivot axis PA. The closure lever 104 has a generally L-shape with a back wall 105 and at least one elongated leg 104A and at least one arm 104B extending outwardly from the back wall 105. The closure lever 104 is pivotal between a rest position and a rotated position in the directions of arrows B1 and B2 of FIG. 5. In the rest position, the leg 104A and the back wall 105 of the closure lever 104 is positioned adjacent and/or abuts against the inner surface 110 of the lid 24, as shown in FIG. 5. In the rotated position, the closure lever 104 is rotated about the closure lever pivot axis PA with the arm 104B abutting the inner surface 110 of the lid 24, as shown in FIG. 5. The closure lever biasing member 106 biases the closure lever 104 towards the rest position.

The flexible connector 102 includes a first or lid end 112 and an opposite second or elevator end 114. The lid end 112 is connected to the closure lever 104. In some embodiments, the elevator end 114 is secured to the trolley 78. In some other embodiments, the elevator end 114 is secured to the elevator floor 80. A portion of the flexible connector 102 between the lid end 112 and the elevator end 114 contacts the roller 95 positioned between the pair of side walls 88 of the elongated track 76. In some embodiments, the flexible connector 102 may be a strap, a cord, or a tether.

In order to facilitate a better understanding of the drone delivery container assembly 1, an operation will now be discussed. Initially, the drone delivery container assembly 1 is in the delivered state, as shown in FIG. 6, in which the lid 24 is in the closed position, the closure lever 104 is in the rotated position, and the elevator floor 80 is in the lowered position. When a drone is in proximity to the drone delivery container assembly 1, a delivery signal is received by the transceiver 35. It is to be understood that the package P and/or the drone D includes a transmitter T, such as an RFID, NFC, or Bluetooth transmitter/receiver that transmits the delivery signal to the transceiver 35.

The detection logic 38A detects that a signal has been received by the transceiver 35 and the control logic 38B controls the drone delivery container assembly 1 to move from the delivered state to the delivery state, as shown in FIG. 5. The control logic 38B controls the electric motor 46 to rotate the drive shaft 54 in a first direction. Upon activation of the electric motor 46, the drive shaft 54 rotates at the preset input rotational speed in the first direction. The rotation of the drive shaft 54 at the preset input rotational speed is received by the gear assembly 48 at the first timing sprocket 62 which rotates the reducing gear 66 through the first timing belt 64. The connection between the reducing gear 66 and the second sprocket 68 varies the preset input rotational speed from the drive shaft 54 to a preset rotational output speed and transmits the predetermined output rotational speed to the third sprocket 72 through the second timing belt 70. The third sprocket 72 rotates the translation screw drive 74 at the predetermined rotational output speed. The rotation of the translation screw drive 74 drives the trolley 78 and the elevator floor 80 in the container vertical direction such that that the trolley 78 and the elevator floor 80 move in the direction of arrow A1 in FIG. 5.

When the drone delivery container assembly 1 is in the closed position, the closure lever 104 is in the rotated position and the lid 24 is in the closed position. As the elevator floor 80 moves in the direction of arrow A1 from the lowered position towards the raised position, a tension on the flexible connector 102 that overcomes the biasing force of the closure lever biasing member 106 is reduced such that the biasing force of the closure lever biasing member 106 biases the closure lever 104 from the rotated position towards the rest position in the direction of arrow B1 in FIG. 5. As the closure lever 104 is rotated from the rotated position towards the rest position, the tension of the flexible connector 102 that overcomes the biasing force of the lid hinge biasing member 101 is reduced such that the biasing force of the lid hinge biasing member 101 biases the lid 24 from the closed position towards the open position. Upon movement of the elevator floor 80 into the raised position, the tension from the flexible connector 102 is reduced such that the closure lever biasing member 106 biases the closure lever 104 into the rest position. Once the closure lever 104 rotates to the rest position such that the leg 104A abuts against the inner surface 110 of the lid 24, the lid hinge biasing member 101 biases the lid 24 from the closed position to the open position. Thus, it is to be appreciated that rotation of the lid 24 to the open position is delayed until the closure lever 104 is rotated to the rest position against the lid 24. Accordingly, the actuation of the electric motor 46 to move the elevator floor 80 from the lowered position to the raised position also operates to move the lid 24 from the closed position to the open position.

The delivery state assembly 40 operates to move the drone delivery container assembly 1 from the delivered state to the delivery state upon movement of the elevator floor 80 into the raised position, the closure lever 104 into the rest position, and the lid 24 into the open position. In the delivery state, the elevator floor 80 is in the raised position, the closure lever 104 is in the rest position, and the lid 24 is in the open position. In the delivery state, the drone delivery container assembly 1 is configured to receive a delivered package.

Once a package is delivered onto the elevator floor 80, the drone departs. In some embodiments, the departing drone sends a package delivered signal that is received by the transceiver 35 of the drone delivery container assembly 1. In some other embodiments, the drone delivery container assembly 1 includes sensors to determine that the package has been delivered and the drone D has departed. The detection logic 38A detects the delivered package signal and the control logic 38B controls the delivery state assembly 40 to move the drone delivery container assembly 1 from the delivery state to the delivered state.

The delivery state assembly 40 operates to move the drone delivery container assembly 1 from the delivery state to the delivered state. Upon detection that the drone D has departed and that the package has been received on the elevator floor 80, the control logic 38B controls the electric motor 46 to rotate in a second direction opposite the first direction.

Upon activation of the electric motor 46, the drive shaft 54 rotates in the second direction at the preset output rotational speed. The rotation of the drive shaft 54 in the second direction at the preset output rotational speed is received by the gear assembly 48 at the first timing sprocket 62 which rotates the reducing gear 66 through the first timing belt 64. The connection between the reducing gear 66 and the second sprocket 68 varies the preset output rotational speed from the drive shaft 54 to the predetermined rotational input speed and transmits the predetermined rotational input speed to the third sprocket 72 through the second timing belt 70. The third sprocket 72 rotates the translation screw drive 74 at the predetermined rotational input speed. The rotation of the translation screw drive 74 drives the trolley 78 and the elevator floor 80 in the container vertical direction such that that the trolley 78 and the elevator floor 80 move in the direction of arrow A2 in FIG. 6 to move the elevator floor 80 from the raised position towards the lowered position.

As the elevator floor 80 moves in the direction of arrow A2 from the raised position towards the lowered position, the elevator end 114 of the flexible connector 102, which is connected to the elevator floor 80 and/or the trolley 78, pulls the flexible connector 102 downward in the direction of arrow A2.

When the drone delivery container assembly 1 is in the open position, the closure lever 104 in the rest position and the lid 24 is in the open position. As the elevator floor 80 moves downward in the direction of arrow A2, a tension in the flexible connector 102 overcomes the biasing force of the closure lever biasing member 106, which biases the closure lever 104 towards the rest position, to rotate the closure lever 104 from the rest position towards the rotated position. As the flexible connector 102 pulls the closure lever 104 from the rest position towards the rotated position, the biasing force of the lid hinge biasing member 101 maintains the lid 24 in the open position as the lid end 112 of the flexible connector 102 is connected to the closure lever 104 which is pivotally connected to the inner surface 110 of the lid 24. The lid 24 remains in the open position until the closure lever 104 rotates into the rotated position in which the arm 104B abuts against the inner surface 110 of the lid 24. The flexible connector 102 is provided with a predetermined length such that the elevator floor 80 descends a predetermined distance from the raised position towards the lowered position in the direction of arrow A2 such that the package disposed on the elevator floor 80 does not interfere with the lid 24 moving from the open position towards the closed position. Specifically, the lid 24 remains in the open position, due to the biasing force of the lid hinge biasing member 101, until the flexible connector 102 pulls the closure lever 104 to rotate from the rest position to the rotated position. Thus, rotation of the lid 24 to the closed position is delayed until the closure lever 104 is rotated to the rotated position. Accordingly, when the flexible connector 102 pulls the closure lever 104 into the rotated position in the direction of arrow B2, the elevator floor 80 has descended a predetermined distance into the storage space 20 such that the package positioned on the elevator floor 80 does not inhibit movement of the lid 24 from the open position towards the closed position.

As such, the lid 24 is retained in the open position until the closure lever 104 is rotated into the rotated position in which the arm 104B contacts the inner surface 110 of the lid 24. Once the closure lever 104 is rotated into the rotated position in which the arm 104B contacts the inner surface 110 of the lid 24, the continued movement of the elevator floor 80 downward in the direction of arrow A2, the flexible connector 102 pulls on the lid 24 to overcome the biasing force of the lid biasing member 101 to move the lid 24 from the open position towards the closed position.

Once the closure lever 104 has rotated into the rotated position, the arm 104B abuts the inner surface 110 of the lid 24 and the continued movement of the elevator floor 80 towards the lowered position in the direction of arrow A2 continues to apply a tension to the lid end 112 of the flexible connector 102. As the arm 104B abuts the inner surface 110 of the lid 24, the tension from the pulling of the flexible connector 102 is applied to the lid 24. The tension from the flexible connector 102 overcomes the biasing force of the lid hinge biasing member 101 such that the lid 24 moves from the open position towards the closed position. Upon movement of the elevator floor 80 into the lowered position, the flexible connector 102 pulls the lid 24 into the closed position and the tension from the flexible connector 102 retains the lid 24 in the closed position.

As the flexible connector 102 has the elevator end 114 connected to the elevator floor 80 and/or the trolley 78 and the lid end 112 connected to the closure lever 104 which is connected to the lid 24, the flexible connector 102 prevents the lid 24 from being moved from the closed position to the open position when the elevator floor 80 is in the lowered position due to the tension from the flexible connector 102 and the engagement of the internal threads of the trolley 78 and the external threads of the translation screw drive 74. Specifically, the elevator floor 80 is inhibited from moving from the lowered position towards the raised position without the rotation of the translation screw drive 74.

Accordingly, the delivery state assembly 40 is configured to position the drone delivery container assembly 1 from a delivered state to a delivery state such that the elevator floor 80 is raised from the lowered position to the raised position in order to receive a package at the open top portion 22 while also moving the lid 24 from the closed position to the open position in one operation by controlling the electric motor 46 to rotate the drive shaft 54 in the first direction. Further, the delivery state assembly 40 is configured to position the drone delivery container assembly 1 from the delivery state to the delivered state such that the elevator floor 80 is lowered from the raised position to the lowered position in order to store the package within the storage space 20 while also moving the lid 24 from the open position to the closed position in one operation by controlling the electric motor 46 to rotate the drive shaft 54 in the second direction.

Further still, the delivery state assembly 40 is configured to retain the lid 24 in the closed position until the electric motor 46 is controlled to rotate the drive shaft 54 in the first direction. As such, the delivery state assembly 40 prevents unauthorized users from opening the lid 24 to retrieve the package.

In some embodiments, the drone delivery container assembly 1 includes a fence 122 that extends upwardly from the elevator floor 80. The fence 122 inhibits a package P from falling off the elevator floor 80 during delivery, and inhibits the package P from falling off the elevator floor 80 as the elevator floor 80 is moved between the raised position and the lowered position.

In some embodiments, the drone delivery container assembly 1 includes a light curtain assembly 124 in communication with the electronic control unit 34. The light curtain assembly 124 includes a light transmitter 126, a pair of light reflectors 128, and a light receiver 130. The light transmitter 126 is provided on one corner of the rear wall 14, the pair of light reflectors 128 are provided on the corners of the front wall 12, and the light receiver 130 is provided on the other corner of the rear wall 14. The light transmitter 126 transmits a light beam that is reflected by the pair of light reflectors 128 to the light receiver 130. When the light receiver 130 fails to receive the light beam from the light transmitter 126, the light receiver 130 sends a signal to the detection logic 38A indicating that an obstruction has broken or disrupted the light beam. The control logic 38B prevents the delivery state assembly 40 from moving between the delivered state and the delivery state when an obstruction is detected. The light curtain assembly 124 inhibits operation of the delivery state assembly 40 when obstructions would interfere with the movement of the lid 24 between the open position and the closed position and the elevator floor 80 between the raised position and the lowered position. The control logic 38B may be configured to control the transceiver 35 to transmit a signal to the preauthorized user, the drone D, the delivery person, and/or the delivery service indicating the detection of an obstruction.

In some embodiments, the drone delivery container assembly 1 includes a plurality of anchor feet 132. The anchor feet 132 are configured to be mounted to a surface, such as ground, to prevent unauthorized movement of the drone delivery container assembly 1.

It is appreciated that the drone delivery container assembly 1 is not limited in use to drone delivery. Specifically, the drone delivery container assembly 1 is configured to allow delivery of a package by human deliverers to be securely retained within the drone delivery container assembly 1. In this instance, the signal being sent to the transceiver 35 may be sent by the human deliverer via a personal computing device. The personal computing device may be a mobile computing device, such as a smartphone, including a CPU. In various embodiments, the mobile computing device signals to the transceiver 35 to open or close the drone delivery container assembly 1 once the human deliverer enters a code, activates a mobile application in communication with the transceiver 35, or by any other suitable methods. This allows the drone delivery container assembly 1 to be operated remotely as opposed to being restricted to utilizing the user interface 28.

As noted above, the package P and/or the drone D includes a transmitter T, such as an RFID, NFC, or Bluetooth transmitter/receiver. In some embodiments, the transmitter T is used to transmit a temperature characteristic of the package to the transceiver 35 in the drone delivery container assembly 1. The temperature characteristic may include preset temperature zones that correlate to "frozen", "cold", "cool", "room temperature", "warm", or "hot". The memory component 38 includes pre-stored temperatures for the temperature zones. The temperature characteristic may also include a predetermined temperature for the package P. For example, when the package P is ice cream, the temperature characteristic is identified as "frozen" and/or the predetermined temperature. The signal from the transmitter T is received by the transceiver 35 and the detection logic 38A detects the temperature characteristic and the control logic 38B controls the temperature regulator assembly 26 to regulate the internal temperature of the storage space 20 to the temperature characteristic.

In some other embodiments, the delivery service, such as the drone D or a delivery person, sends a signal to the drone delivery container assembly 1 that includes the temperature characteristic of the package P. The signal is received by the transceiver 35 and the detection logic 38A detects the temperature characteristic and the control logic 38B controls the temperature regulator assembly 26 to regulate the internal temperature of the storage space 20 to the temperature characteristic or predetermined temperature.

In some other embodiments, the delivery person inputs a temperature characteristic of the package P into the drone delivery container assembly 1 through the user interface 28. The detection logic 38A detects the temperature characteristic and the control logic 38B controls the temperature regulator assembly 26 to regulate the internal temperature of the storage space 20 to the temperature characteristic or predetermined temperature.

In some embodiments, the transceiver 35 connects to a processing center of the delivery service, such as through the internet, and receives the temperature characteristic. The detection logic 38A detects the temperature characteristic and the control logic 38B controls the temperature regulator assembly 26 to regulate the internal temperature of the storage space 20 to the temperature characteristic or predetermined temperature.

In some other embodiments, a preauthorized user communicates with the drone delivery container assembly 1 to set a temperature characteristic. For example, the preauthorized user utilizes a mobile computer device, such as a smartphone, that communicates with the drone delivery container assembly 1 through the transceiver 35 to input a temperature characteristic. In either instance, the set temperature characteristic and the actual temperature within the drone delivery container assembly 1 may be displayed on the display device 30.

In some embodiments, the drone delivery container assembly 1 is configured to only move between the delivered state and the delivery state upon input of a predetermined access code. The predetermined access code may be an electronic access code that is transmitted to the transceiver 35 of the drone delivery container assembly 1 by the drone D, the package P, the delivery person, and/or the mobile computing device of the preauthorized user. The predetermined access code may be a numerical access code that is input into user interface 28, such as the inputs 32, by the delivery person and/or the preauthorized user. In some embodiments, the drone D, package P, the mobile computing device of the preauthorized user, and/or the delivery person transmits an electronic access code to the transceiver 35 of the drone delivery container assembly 1 and the preauthorized user inputs the numerical access code into the user interface 28, such as the inputs 32. It is to be understood that the delivery signal and the package delivered signal may be sent directly to the detection logic 38A without the use of the transceiver 35 by operation of the user interface 28.

Accordingly, unauthorized access to the storage space 20 of the drone delivery container assembly 1 is inhibited by requiring a predetermined access code to be received/input into the drone delivery container assembly 1 in order to move the drone delivery container assembly 1 between the delivered state and the delivery.

While particular embodiments and aspects of the present disclosure have been illustrated and described herein, various other changes and modifications can be made without departing from the scope of the disclosure. Moreover, although various aspects have been described herein, such aspects need not be utilized in combination. It is therefore intended that the appended claims cover all such changes and modifications that are within the scope of the embodiments shown and described herein.

What is claimed is:

1. A delivery container assembly for receiving a package, the delivery container assembly comprising:
    a container having at least one wall and an open top end defining a storage space, the container including a lid hingedly coupled to the at least one wall of the container and movable between an open position and a closed position;
    an elevator assembly disposed within the container, the elevator assembly including an elevator floor movable between a lowered position and a raised position, the lid coupled to the elevator assembly such that, upon movement of the elevator floor from the lowered position to the raised position, the lid moves from the closed position to the open position;
    a closure lever pivotally coupled to the lid; and
    a connector coupling the closure lever to the elevator assembly.

2. The delivery container assembly of claim 1, wherein, upon movement of the elevator floor from the raised position to the lowered position, the lid moves from the open position to the closed position.

3. The delivery container assembly of claim 2,
    wherein the connector has a first end and an opposite second end, the first end coupled to the closure lever and the second end coupled to the elevator floor.

4. The delivery container assembly of claim 1, wherein the closure lever includes a leg and an arm extending outwardly from the leg, the closure lever is pivotally coupled to the lid between a rest position and a rotated position, in the rest position the arm is spaced apart from an inner surface of the lid and in the rotated position the arm abuts the inner surface of the lid, and
    wherein a closure lever biasing member biases the closure lever towards the rest position.

5. The delivery container assembly of claim 4, wherein, as the elevator floor moves from the raised position to the lowered position, the connector pulls the closure lever from the rest position to the rotated position prior to rotation of the lid from the open position to the closed position.

6. The delivery container assembly of claim 4, wherein, as the elevator floor moves from the lowered position to the raised position, the connector allows the closure lever to pivot from the rotated position to the rest position prior to rotation of the lid from the closed position to the open position.

7. A delivery container assembly comprising:
    a container having a plurality of walls and an open top end defining a storage space, the container including a lid hingedly attached to one of the plurality of walls and a connector, the lid movable between an open position and a closed position; and
    an elevator assembly disposed within the container, the elevator assembly including an elevator floor movable between a lowered position and a raised position, the connector coupling the elevator assembly to the lid, the delivery container assembly configured to delay rotation of the lid as the elevator floor moves between the raised position and the lowered position.

8. The delivery container assembly of claim 7 further comprising:
    a lid hinge biasing member that biases the lid towards the open position;
    a closure lever pivotally attached to the lid, the closure lever movable between a rest position and a rotated position; and a closure lever biasing member that biases the closure lever towards the rest position, the connector pulling the closure lever from the rotated position as the elevator floor moves from the raised position to the lowered position.

9. The delivery container assembly of claim 7 further comprising:
a temperature regulator assembly including at least one of a refrigerator and a heater, the temperature regulator assembly configured to regulate a temperature of the storage space of the container.

10. The delivery container assembly of claim 9 further comprising:
an electronic control unit; and
a transceiver coupled to the electronic control unit, the transceiver configured to receive a signal including temperature characteristics, the electronic control unit configured to control the temperature regulator assembly to regulate the temperature of the storage space based on the temperature characteristics.

11. The delivery container assembly of claim 7 further comprising:
a motor;
a transceiver; and
an electronic control unit coupled to the transceiver and the motor, the electronic control unit configured to operate the motor to move the elevator floor to the raised position upon the transceiver receiving a delivery signal, the lid moves from the closed position towards the open position as the elevator moves from the lowered position towards the raised position.

12. The delivery container assembly of claim 7 further comprising:
a motor;
a transceiver; and
an electronic control unit, the electronic control unit configured to operate the motor to move the elevator floor to the lowered position upon the transceiver receiving a package delivered signal, the lid moves from the open positon towards the closed position as the elevator floor moves from the raised position towards the lowered position.

13. The delivery container assembly of claim 7, wherein the elevator assembly further comprises:
a motor including a drive shaft; and
a linear motion assembly coupled to the motor and the elevator floor such that operating of the motor moves the elevator floor between the raised position and the lowered position.

14. The delivery container assembly of claim 13, wherein the linear motion assembly includes an externally threaded translation screw drive, an elongated track, and an internally threaded trolley, the internally threaded trolley coupled to the elevator floor.

15. A method for opening and closing a delivery container assembly comprising the steps of:
receiving at an electronic control unit a delivery signal;
upon receiving the delivery signal, moving an elevator floor provided within the container from a lowered position to a raised position, the elevator floor configured to rotate a lid hingedly attached to the container from a closed position towards an open position upon movement of the elevator floor from the lowered position towards the raised position;
rotating a closure lever pivotally attached to the lid prior to rotating the lid as the elevator floor moves between the lowered position and the raised position;
receiving at the electronic control unit a package delivered signal; and
upon receiving the package delivered signal, moving the elevator floor from the raised position to the lowered position, the elevator floor configured to rotate the lid from the open position to the closed position.

16. The method for opening and closing a delivery container assembly of claim 15, wherein the lid includes a lid hinge biasing member biasing the lid to the open position and the closure lever includes a closure lever biasing member biasing the closure lever to a rest position, the closure lever biasing member biasing the closure lever prior to the lid hinge biasing member biasing the lid.

17. The method for opening and closing a delivery container assembly of claim 16 wherein, as the elevator floor moves from the raised position towards the lowered position, the connector pulls the closure lever from the rest position towards the rotated position prior to rotation of the lid from the open position towards the closed position.

18. The method for opening and closing a delivery container assembly of claim 16 wherein, as the elevator floor moves from the lowered position towards the raised position, the connector allows the closure lever to pivot from the rotated position towards the rest position prior to rotation of the lid from the closed position towards the open position.

19. The method for opening and closing a delivery container assembly of claim 15 further comprising:
receiving at the transceiver a temperature characteristic of a package to be delivered; and
upon receiving the temperature characteristic, controlling a temperature regulator assembly including a refrigerator and a heater to adjust an internal temperature of the container.

* * * * *